(12) United States Patent
Gong (10) Patent No.: US 10,453,415 B2
(45) Date of Patent: Oct. 22, 2019

(54) GOA CIRCUIT AND EMBEDDED TOUCH DISPLAY PANEL

(71) Applicant: WUHAN CHINA STAR OPTOELECTRONICS TECHNOLOGY CO., LTD., Wuhan (CN)

(72) Inventor: Qiang Gong, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 2 days.

(21) Appl. No.: 15/741,776

(22) PCT Filed: Dec. 28, 2017

(86) PCT No.: PCT/CN2017/119428
§ 371 (c)(1),
(2) Date: Jan. 4, 2018

(87) PCT Pub. No.: WO2019/104813
PCT Pub. Date: Jun. 6, 2019

(65) Prior Publication Data
US 2019/0164515 A1    May 30, 2019

(30) Foreign Application Priority Data
Nov. 29, 2017    (CN) .......................... 2017 1 1225029

(51) Int. Cl.
*G06F 3/041*    (2006.01)
*G09G 3/36*    (2006.01)

(52) U.S. Cl.
CPC ......... *G09G 3/3677* (2013.01); *G06F 3/0412* (2013.01); *G06F 3/0416* (2013.01); *G09G 2300/0426* (2013.01); *G09G 2310/0283* (2013.01); *G09G 2330/027* (2013.01)

(58) Field of Classification Search
CPC ......... G09G 3/3677; G09G 2300/0426; G09G 2310/0283; G09G 2330/027; G06F 3/0412; G06F 3/0416
See application file for complete search history.

(56) References Cited

U.S. PATENT DOCUMENTS

| 7,872,628 B2 * | 1/2011 | Cho ..................... G09G 3/3677 345/100 |
| 9,875,706 B1 * | 1/2018 | Gong ....................... G09G 3/36 |
| 9,928,795 B2 * | 3/2018 | Gong ................... G09G 3/3648 |

(Continued)

FOREIGN PATENT DOCUMENTS

| CN | 103927998 A | 7/2014 |
| CN | 105206237 A | 12/2015 |

(Continued)

*Primary Examiner* — Joe H Cheng
(74) *Attorney, Agent, or Firm* — JMB Davis Ben-David (57) ABSTRACT

A GOA circuit and an embedded touch display panel are provided. By providing an abnormity protection module in the nth-level GOA unit, the level of the scanning signal of the nth-level GOA unit is pulled up when the embedded touch display panel is powered off abnormally. The risk of abnormal display resulted from the residual of charges in pixels due to the abnormal power-off of the GOA circuit is reduced.

20 Claims, 3 Drawing Sheets

(56) References Cited

U.S. PATENT DOCUMENTS

| | | | |
|---|---|---|---|
| 10,049,639 B2 * | 8/2018 | Gong | G11C 19/28 |
| 10,163,414 B2 * | 12/2018 | Gong | G09G 3/3266 |
| 2008/0101529 A1 * | 5/2008 | Tobita | G09G 3/3677 377/64 |
| 2010/0260312 A1 * | 10/2010 | Tsai | G09G 3/3677 377/79 |
| 2016/0019976 A1 * | 1/2016 | Pai | G09G 3/3266 345/204 |
| 2016/0179258 A1 * | 6/2016 | Fan | G06F 1/06 345/173 |
| 2016/0365050 A1 * | 12/2016 | Qing | G09G 3/3677 |
| 2016/0378242 A1 * | 12/2016 | Huang | G06F 3/0416 345/173 |
| 2017/0102805 A1 | 4/2017 | Xiao et al. | |
| 2017/0124975 A1 | 5/2017 | Xiao et al. | |
| 2018/0068628 A1 | 3/2018 | Xiao et al. | |
| 2018/0068630 A1 * | 3/2018 | Xiao | G09G 3/3677 |
| 2019/0019469 A1 * | 1/2019 | Lv | G09G 3/3677 |

FOREIGN PATENT DOCUMENTS

| | | |
|---|---|---|
| CN | 105489180 A | 4/2016 |
| CN | 105976781 A | 9/2016 |

\* cited by examiner

GOA CIRCUIT AND EMBEDDED TOUCH DISPLAY PANEL

CROSS-REFERENCE TO RELATED APPLICATIONS

This is the U.S. National Stage of International Patent Application No. PCT/CN2017/119428, filed Dec. 28, 2017, which in turn claims the benefit of Chinese Patent Application No. 201711225029.X, filed Nov. 29, 2017.

FIELD OF INVENTION

The present disclosure relates to the technical field of display technology, and more particularly to a GOA circuit and an embedded touch display panel.

BACKGROUND OF INVENTION

The GOA (i.e. gate driver on array) technique is a driving method that achieves progressive scanning by manufacturing a gate scanning driving circuit on a thin-film transistor array substrate by a thin-film transistor liquid crystal display array manufacturing process.

At present, with the maturity of the integrated touch panel technique, embedded touch display panels are often used as display panels. In an embedded touch display panel, there is a risk that a constant-voltage high level cannot maintain at a high voltage level due to the competition between circuits when abnormal power-off occurs in the panel. As a result, the residual electric charges in the pixels cannot be released, which causes the residual of electric charges in the pixels and abnormal display of the panel.

SUMMARY OF INVENTION

An objective of an embodiment of the present invention is to provide a GOA circuit and an embedded touch display panel, by which the risk of abnormal display resulted from the residual of charges in pixels due to the abnormal power-off of the GOA circuit can be reduced.

A GOA (Gate driver On Array) circuit is applied in an embedded touch display panel, and comprises multiple levels of GOA units which are cascaded with each other, the nth-level GOA unit comprising a forward/reverse scanning control module, a node control module, an output module, an output control module, and an abnormity protection module; wherein the forward/reverse scanning control module is configured to output a first node control signal at a first node and output a second node control signal at a second node according to a forward scanning DC control signal and a reverse scanning DC control signal;

the node control module is coupled to the first node and the second node and configured to pull the first node control signal down to a constant-voltage low level and pull the second node control signal up to a constant-voltage high level;

the output module is coupled to the first node and electrically connected to a first clock signal and configured to output a scanning signal according to the first node control signal and the first clock signal;

the output control module is electrically connected to the first control signal and configured to control the level of the scanning signal according to the first control signal; and the abnormity protection module is coupled to an output end of the output module and electrically connected to a second control signal, and configured to pull the level of the scanning signal up when the embedded touch display panel is powered off abnormally;

wherein the abnormity protection module comprises a second thin-film transistor; and the second control signal is applied to a source and a gate of the second thin-film transistor, and a drain of the second thin-film transistor is connected to the output end of the output module;

when the GOA circuit scans forward, the forward scanning DC control signal is in high level and the reverse scanning DC control signal is in low level; and when the GOA circuit scans reversely, the forward scanning DC control signal is in low level and the reverse scanning DC control signal is in high level.

In the GOA circuit of the present disclosure, the forward/reverse scanning control module comprises a third thin-film transistor, a fourth thin-film transistor, a fifth thin-film transistor, a first capacitor and a second capacitor;

the forward scanning DC control signal is applied to a source of the third thin-film transistor, a scanning signal of a (n−2)th-level GOA unit is applied to a gate of the third thin-film transistor, and a drain of the third thin-film transistor is connected to the first node, the drain of the second thin-film transistor, and the gate of the third thin-film transistor;

the reverse scanning DC control signal is applied to a source of the fourth thin-film transistor, and a scanning signal of a (n+2)th-level GOA unit is applied to a gate of the fourth thin-film transistor;

the constant-voltage low level is applied to a source of the fifth thin-film transistor, and a drain of the fifth thin-film transistor is connected to the second node;

one end of the first capacitor is connected to the first node and the constant-voltage low level is applied to the other end of the first capacitor; and one end of the second capacitor is connected to the second node and the constant-voltage low level is applied to the other end of the second capacitor.

In the GOA circuit of the present disclosure, the node control module comprises a sixth thin-film transistor, a seventh thin-film transistor, an eighth thin-film transistor and a ninth thin-film transistor;

a second clock signal is applied to a source of the sixth thin-film transistor, the forward scanning DC control signal is applied to a gate of the sixth thin-film transistor, and a drain of the sixth thin-film transistor is connected to a gate of the eighth thin-film transistor;

a third clock signal is applied to a source of the seventh thin-film transistor, the reverse scanning DC control signal is applied to a gate of the seventh thin-film transistor, and a drain of the seventh thin-film transistor is connected to the gate of the eighth thin-film transistor;

the constant-voltage high level is applied to a source of the eighth thin-film transistor, and a drain of the eighth thin-film transistor is connected to the second node; and the constant-voltage low level is applied to a source of the ninth thin-film transistor, a gate of the ninth thin-film transistor is connected to the second node, and a drain of the ninth thin-film transistor is connected to the first node.

In the GOA circuit of the present disclosure, the output module comprises a tenth thin-film transistor; and the first clock signal is applied to a source of the tenth thin-film transistor, a gate of the tenth thin-film transistor is connected to the first node, and a drain of the tenth thin-film transistor is connected to the output end of the output module.

In the GOA circuit of the present disclosure, the output module comprises an eleventh thin-film transistor and a twelfth thin-film transistor;

the second control signal is applied to a source of the eleventh thin-film transistor, a gate of the eleventh thin-film transistor is connected to the second node, and a drain of the eleventh thin-film transistor is connected to the output end of the output module; and the second control signal is applied to a source of the twelfth thin-film transistor, the first control signal is applied to a gate of the twelfth thin-film transistor, and a drain of the twelfth thin-film transistor is connected to the output end of the output module.

In the GOA circuit of the present disclosure, the nth-level GOA unit further comprises a reset module; and the reset module comprises a thirteenth thin-film transistor, a reset signal is applied to a source and to a drain of the thirteenth thin-film transistor, and a drain of the thirteenth thin-film transistor is electrically connected to the second node.

A GOA (Gate driver On Array) circuit is applied in an embedded touch display panel, and comprises multiple levels of GOA units which are cascaded with each other, the nth-level GOA unit comprising a forward/reverse scanning control module, a node control module, an output module, an output control module, and an abnormity protection module; wherein the forward/reverse scanning control module is configured to output a first node control signal at a first node and output a second node control signal at a second node according to a forward scanning DC control signal and a reverse scanning DC control signal;

the node control module is coupled to the first node and the second node and configured to pull the first node control signal down to a constant-voltage low level and pull the second node control signal up to a constant-voltage high level;

the output module is coupled to the first node and electrically connected to a first clock signal and configured to output a scanning signal according to the first node control signal and the first clock signal;

the output control module is electrically connected to the first control signal and configured to control the level of the scanning signal according to the first control signal; and the abnormity protection module is coupled to an output end of the output module and electrically connected to a second control signal, and configured to pull the level of the scanning signal up when the embedded touch display panel is powered off abnormally.

In the GOA circuit of the present disclosure, wherein the abnormity protection module comprises a second thin-film transistor; and the second control signal is applied to a source and a gate of the second thin-film transistor, and a drain of the second thin-film transistor is connected to the output end of the output module.

In the GOA circuit of the present disclosure, the forward/reverse scanning control module comprises a third thin-film transistor, a fourth thin-film transistor, a fifth thin-film transistor, a first capacitor and a second capacitor;

the forward scanning DC control signal is applied to a source of the third thin-film transistor, a scanning signal of a (n−2)th-level GOA unit is applied to a gate of the third thin-film transistor, and a drain of the third thin-film transistor is connected to the first node, the drain of the second thin-film transistor, and the gate of the third thin-film transistor;

the reverse scanning DC control signal is applied to a source of the fourth thin-film transistor, and a scanning signal of a (n+2)th-level GOA unit is applied to a gate of the fourth thin-film transistor;

the constant-voltage low level is applied to a source of the fifth thin-film transistor, and a drain of the fifth thin-film transistor is connected to the second node;

one end of the first capacitor is connected to the first node and the constant-voltage low level is applied to the other end of the first capacitor; and one end of the second capacitor is connected to the second node and the constant-voltage low level is applied to the other end of the second capacitor.

In the GOA circuit of the present disclosure, the node control module comprises a sixth thin-film transistor, a seventh thin-film transistor, an eighth thin-film transistor and a ninth thin-film transistor;

a second clock signal is applied to a source of the sixth thin-film transistor, the forward scanning DC control signal is applied to a gate of the sixth thin-film transistor, and a drain of the sixth thin-film transistor is connected to a gate of the eighth thin-film transistor;

a third clock signal is applied to a source of the seventh thin-film transistor, the reverse scanning DC control signal is applied to a gate of the seventh thin-film transistor, and a drain of the seventh thin-film transistor is connected to the gate of the eighth thin-film transistor;

the constant-voltage high level is applied to a source of the eighth thin-film transistor, and a drain of the eighth thin-film transistor is connected to the second node; and the constant-voltage low level is applied to a source of the ninth thin-film transistor, a gate of the ninth thin-film transistor is connected to the second node, and a drain of the ninth thin-film transistor is connected to the first node.

In the GOA circuit of the present disclosure, the output module comprises a tenth thin-film transistor; and the first clock signal is applied to a source of the tenth thin-film transistor, a gate of the tenth thin-film transistor is connected to the first node, and a drain of the tenth thin-film transistor is connected to the output end of the output module.

In the GOA circuit of the present disclosure, the output module comprises an eleventh thin-film transistor and a twelfth thin-film transistor;

the second control signal is applied to a source of the eleventh thin-film transistor, a gate of the eleventh thin-film transistor is connected to the second node, and a drain of the eleventh thin-film transistor is connected to the output end of the output module; and the second control signal is applied to a source of the twelfth thin-film transistor, the first control signal is applied to a gate of the twelfth thin-film transistor, and a drain of the twelfth thin-film transistor is connected to the output end of the output module.

In the GOA circuit of the present disclosure, the nth-level GOA unit further comprises a reset module; and the reset module comprises a thirteenth thin-film transistor, a reset signal is applied to a source and to a drain of the thirteenth thin-film transistor, and a drain of the thirteenth thin-film transistor is electrically connected to the second node.

In the GOA circuit of the present disclosure, when the GOA circuit scans forward, the forward scanning DC control signal is in high level and the reverse scanning DC control signal is in low level; and when the GOA circuit scans reversely, the forward scanning DC control signal is in low level and the reverse scanning DC control signal is in high level.

An embedded touch display panel comprises a GOA circuit, wherein the GOA circuit is configured to be applied in an embedded touch display panel and comprises multiple levels of GOA units which are cascaded with each other, the nth-level GOA unit comprising a forward/reverse scanning control module, a node control module, an output module, an output control module, and an abnormity protection module; wherein the forward/reverse scanning control module is configured to output a first node control signal at a first node and output a second node control signal at a second node according to a forward scanning DC control signal and a reverse scanning DC control signal;

the node control module is coupled to the first node and the second node and configured to pull the first node control signal down to a constant-voltage low level and pull the second node control signal up to a constant-voltage high level;

the output module is coupled to the first node and electrically connected to a first clock signal and configured to output a scanning signal according to the first node control signal and the first clock signal;

the output control module is electrically connected to the first control signal and configured to control the level of the scanning signal according to the first control signal; and the abnormity protection module is coupled to an output end of the output module and electrically connected to a second control signal, and configured to pull the level of the scanning signal up when the embedded touch display panel is powered off abnormally.

In the embedded touch display panel of the present disclosure, the abnormity protection module comprises a second thin-film transistor; and the second control signal is applied to a source and a gate of the second thin-film transistor, and a drain of the second thin-film transistor is connected to the output end of the output module.

In the embedded touch display panel of the present disclosure, when the GOA circuit scans forward, the forward scanning DC control signal is in high level and the reverse scanning DC control signal is in low level; and when the GOA circuit scans reversely, the forward scanning DC control signal is in low level and the reverse scanning DC control signal is in high level.

In the embedded touch display panel of the present disclosure, the forward/reverse scanning control module comprises a third thin-film transistor, a fourth thin-film transistor, a fifth thin-film transistor, a first capacitor and a second capacitor;

the forward scanning DC control signal is applied to a source of the third thin-film transistor, a scanning signal of a (n−2)th-level GOA unit is applied to a gate of the third thin-film transistor, and a drain of the third thin-film transistor is connected to the first node, the drain of the second thin-film transistor, and the gate of the third thin-film transistor;

the reverse scanning DC control signal is applied to a source of the fourth thin-film transistor, and a scanning signal of a (n+2)th-level GOA unit is applied to a gate of the fourth thin-film transistor;

the constant-voltage low level is applied to a source of the fifth thin-film transistor, and a drain of the fifth thin-film transistor is connected to the second node;

one end of the first capacitor is connected to the first node and the constant-voltage low level is applied to the other end of the first capacitor; and one end of the second capacitor is connected to the second node and the constant-voltage low level is applied to the other end of the second capacitor.

In the embedded touch display panel of the present disclosure, the node control module comprises a sixth thin-film transistor, a seventh thin-film transistor, an eighth thin-film transistor and a ninth thin-film transistor;

a second clock signal is applied to a source of the sixth thin-film transistor, the forward scanning DC control signal is applied to a gate of the sixth thin-film transistor, and a drain of the sixth thin-film transistor is connected to a gate of the eighth thin-film transistor;

a third clock signal is applied to a source of the seventh thin-film transistor, the reverse scanning DC control signal is applied to a gate of the seventh thin-film transistor, and a drain of the seventh thin-film transistor is connected to the gate of the eighth thin-film transistor;

the constant-voltage high level is applied to a source of the eighth thin-film transistor, and a drain of the eighth thin-film transistor is connected to the second node; and the constant-voltage low level is applied to a source of the ninth thin-film transistor, a gate of the ninth thin-film transistor is connected to the second node, and a drain of the ninth thin-film transistor is connected to the first node.

In the embedded touch display panel of the present disclosure, the output module comprises a tenth thin-film transistor; and the first clock signal is applied to a source of the tenth thin-film transistor, a gate of the tenth thin-film transistor is connected to the first node, and a drain of the tenth thin-film transistor is connected to the output end of the output module.

In a GOA circuit and an embedded touch display panel of the present disclosure, by providing an abnormity protection module in the nth-level GOA unit, the level of the scanning signal of the nth-level GOA unit is pulled up when the embedded touch display panel is powered off abnormally. The risk of abnormal display resulted from the residual of charges in pixels due to the abnormal power-off of the GOA circuit is reduced.

DESCRIPTION OF DRAWINGS

In order to explain the technical solutions in the present embodiments or in the prior art more clearly, accompanying drawings required in the description of the present embodiments or prior art will be briefly described. Obviously, accompanying drawings are just some embodiments of the present disclosure, while other drawings may be obtained by those skilled in the art according to these drawings, without making any creative effort.

DETAILED DESCRIPTION OF THE PREFERRED EMBODIMENTS

Following description of each embodiment is referring to the accompanying drawings so as to make the contents of the present disclosure more apparent and understandable. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
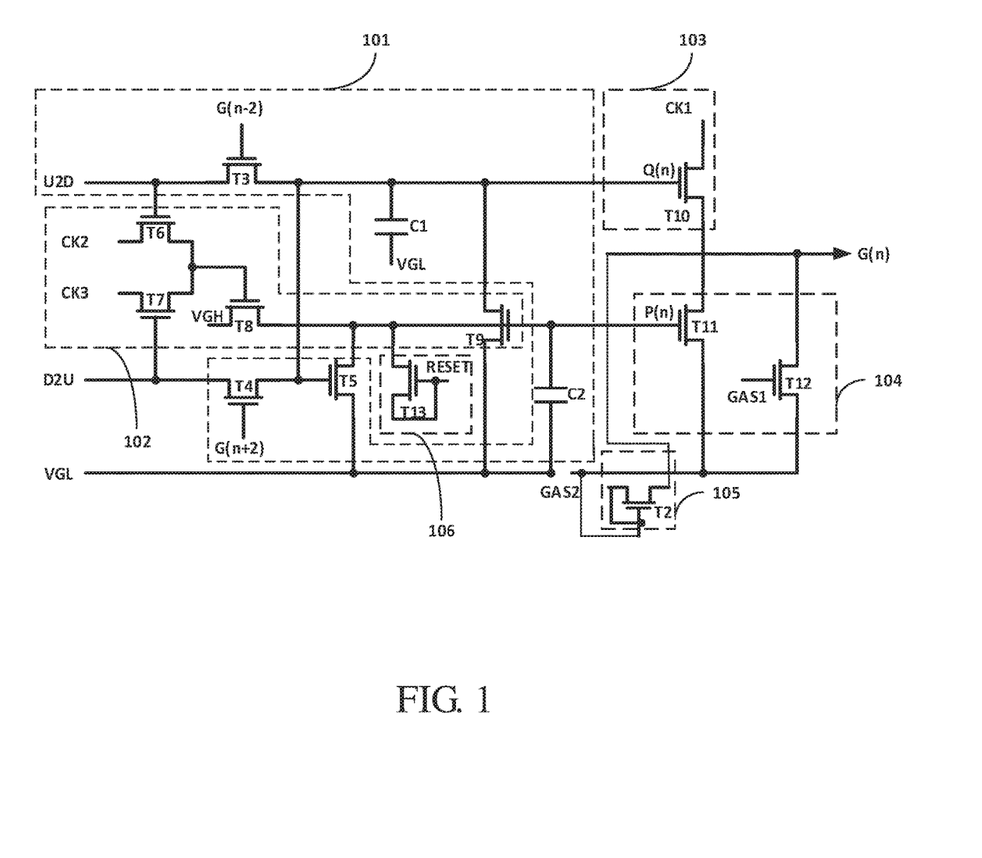
FIG. 1 is a circuit diagram of a GOA circuit according to a preferred embodiment of the present invention.

Please refer to FIG. 1, which is a circuit diagram of a GOA circuit according to an embodiment of the present invention. As shown in FIG. 1, an embodiment of the present invention provides a GOA circuit, comprising multiple levels of GOA units which are cascaded with each other, the nth-level GOA unit comprising a forward/reverse scanning control module 101, a node control module 102, an output module 103, an output control module 104, and an abnormity protection module 105. It is to be noted that the nth-level GOA unit mentioned here is a GOA unit rather than a first-level GOA unit, a second-level GOA unit, a second-last-level GOA unit and a last-level GOA unit.

The forward/reverse scanning control module 101 is configured to output a first node control signal at a first node Q(n) and output a second node control signal at a second node P(n) according to a forward scanning DC control signal U2D and a reverse scanning DC control signal D2U.

Specifically, the forward/reverse scanning control module 101 comprises a third thin-film transistor T3, a fourth thin-film transistor T4, a fifth thin-film transistor T5, a first capacitor C1 and a second capacitor C2. The forward scanning DC control signal U2D is applied to a source of the third thin-film transistor T3, a scanning signal G(n−2) of a (n−2)th-level GOA unit is applied to a gate of the third thin-film transistor T3, and a drain of the third thin-film transistor T3 is connected to the first node Q(n), a drain of the fourth thin-film transistor T4 and a gate of the fifth thin-film transistor T5; the reverse scanning DC control signal D2U is applied to a source of the fourth thin-film transistor T4, and a scanning signal G(n+2) of a (n+2)th-level GOA unit is applied to a gate of the fourth thin-film transistor T4; a constant-voltage low level VGL is applied to a source of the fifth thin-film transistor T5, and a drain of the fifth thin-film transistor T5 is connected to the second node P(n); one end of the first capacitor C1 is connected to the first node Q(n) and the constant-voltage low level VGL is applied to the other end of the first capacitor C1; and one end of the second capacitor C2 is connected to the second node P(n) and the constant-voltage low level VGL is applied to the other end of the second capacitor C2.

The node control module 102 is coupled to the first node Q(n) and the second node P(n) and configured to pull the first node control signal down to the constant-voltage low level VGL and pull the second node control signal up to a constant-voltage high level VGH.

Specifically, the node control module 102 comprises a sixth thin-film transistor T6, a seventh thin-film transistor T7, an eighth thin-film transistor T8 and a ninth thin-film transistor T9. A second clock signal CK2 is applied to a source of the sixth thin-film transistor T6, the forward scanning DC control signal U2D is applied to a gate of the sixth thin-film transistor T6, and a drain of the sixth thin-film transistor T6 is connected to a gate of the eighth thin-film transistor T8; a third clock signal CK3 is applied to a source of the seventh thin-film transistor T7, the reverse scanning DC control signal D2U is applied to a gate of the seventh thin-film transistor T7, and a drain of the seventh thin-film transistor T7 is connected to the gate of the eighth thin-film transistor T8; the constant-voltage high level VGH is applied to a source of the eighth thin-film transistor T8, and a drain of the eighth thin-film transistor T8 is connected to the second node P(n); and the constant-voltage low level VGL is applied to a source of the ninth thin-film transistor T9, a gate of the ninth thin-film transistor T9 is connected to the second node, and a drain of the ninth thin-film transistor T9 is connected to the first node Q(n).

The output module 103 is coupled to the first node Q(n) and electrically connected to a first clock signal CK1 and configured to output a scanning signal G(n) according to the first node control signal and the first clock signal CK1.

Specifically, the output module 103 comprises a tenth thin-film transistor T10; and the first clock signal CK1 is applied to a source of the tenth thin-film transistor T10, a gate of the tenth thin-film transistor T10 is connected to the first node Q(n), and a drain of the tenth thin-film transistor T10 is connected to an output end of the output module 103.

The output control module 104 is electrically connected to the first control signal GAS1 and configured to control the scanning signal G(n) to be in high or low level according to the first control signal GAS1.

Specifically, the output module 104 comprises an eleventh thin-film transistor T11 and a twelfth thin-film transistor T12; a second control signal GAS2 is applied to a source of the eleventh thin-film transistor T11, a gate of the eleventh thin-film transistor T11 is connected to the second node P(n), and a drain of the eleventh thin-film transistor T11 is connected to an output end of the output module 103; and the second control signal GAS2 is applied to a source of the twelfth thin-film transistor T12, the first control signal GAS1 is applied to a gate of the twelfth thin-film transistor T12, and a drain of the twelfth thin-film transistor T12 is connected to the output end of the output module 103.

The abnormity protection module 105 is coupled to the output end of the output module 103 and electrically connected to the second control signal GAS2, and configured to pull the level of the scanning signal G(n) up when the embedded touch display panel is powered off abnormally.

Specifically, the abnormity protection module 105 comprises a second thin-film transistor T2.

The second control signal GAS2 is applied to a source and a gate of the second thin-film transistor T2, and a drain of the second thin-film transistor T2 is connected to the output end of the output module 103.

Further, the nth-level GOA unit further comprises a reset module 106; and the reset module 106 comprises a thirteenth thin-film transistor T13. A reset signal RESET is applied to a source and to a drain of the thirteenth thin-film transistor T13, and a drain of the thirteenth thin-film transistor T13 is electrically connected to the second node P(n). It is to be noted that the reset module 106 can be used to reset the GOA circuit when the GOA circuit operates, so that the GOA circuit becomes more stable.

Figure 2:
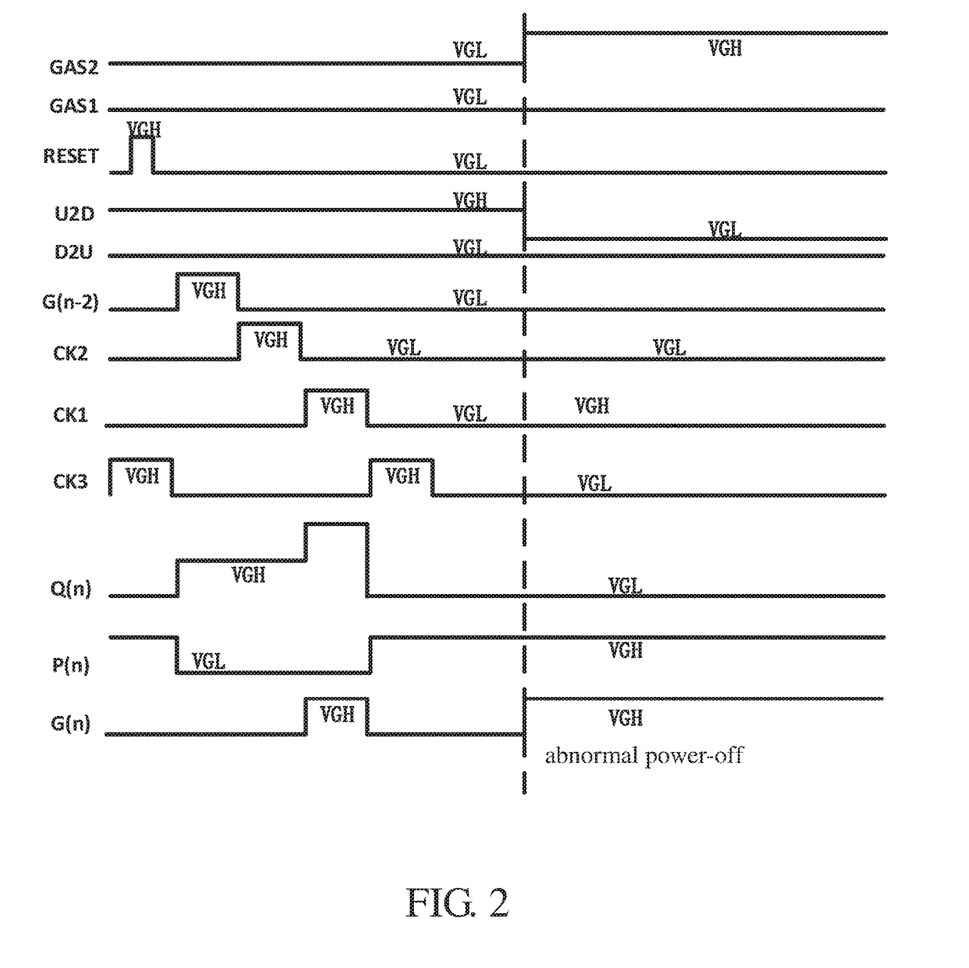
FIG. 2 is a timing diagram of the GOA circuit according to the embodiment of the present invention.

The specific operating process of the GOA circuit according to the embodiment of the present invention will be described with reference to FIG. 2, by exemplifying the forward scanning performed by the GOA circuit according to the embodiment of the present invention. FIG. 2 is a timing diagram of the GOA circuit according to the embodiment of the present invention.

As shown in FIG. 2, it is to be noted that the first control signal GAS1 is in low level when the embedded touch display panel displays normally; and the first control signal GAS1 is in high level when the embedded touch display panel enters a stage in which signal interruption occurs and touch scanning is performed. When the GOA circuit scans forward, the forward scanning DC control signal U2D is in high level and the reverse scanning DC control signal D2U is in low level; and when the GOA circuit scans reversely, the forward scanning DC control signal U2D is in low level and the reverse scanning DC control signal D2U is in high level.

Referring to FIG. 2, when the GOA circuit operates, firstly, the scanning signal G(n−2) of the (n−2)th-level GOA unit is in high level, the third thin-film transistor T3 is turned on, the forward scanning DC control signal U2D which is in high level outputs a first node control signal at the first node Q(n) via the third thin-film transistor T3, and the high level of the first node control signal is stored in the first capacitor C1; and at the same moment, the fifth thin-film transistor T5 is turned on, the constant-pressure low level VGL outputs a second node control signal at the second node P(n) via the fifth thin-film transistor T5, and the low level of the second node control signal is stored in the second capacitor C2.

Then, the first node control signal is retained in high level and the second node control signal is retained in low level, and the first clock signal CK1 outputs a low level; and the same moment, the tenth thin-film transistor T10 is turned on, the low level of the first clock signal CK1 is output to the output end of the output module 103 via the tenth thin-film transistor T10, and the scanning signal G(n) is in low level.

Then, the first clock signal CK1 is in high level, and the first node control signal on the first node Q(n) is boot-strapped to a higher level; and at the same moment, the second node control signal on the second node P(n) is retained in the constant-voltage low level, and the scanning signal G(n) of the nth-level GOA unit is in high level.

Finally, the third clock signal CK3 is in high level, the first node control signal on the first node Q(n) is pulled down to the constant-voltage low level VGL and the second node control signal on the second node P(n) is pulled up to the constant-voltage high level VGH, and the scanning signal G(n) of the nth-level GOA unit is in low level.

Further, in the embodiment of the present disclosure, by providing an abnormity protection module 105, the level of the scanning signal G(n) of the nth-level GOA unit is pulled up when the embedded touch display panel is powered off abnormally. The risk of abnormal display resulted from the residual of charges in pixels due to the abnormal power-off of the GOA circuit is reduced.

Specifically, as shown in FIG. 2, when the embedded touch display panel is powered off abnormally, the second control signal GAS2 outputs a high level, the second thin-film transistor T2 is turned on, and the high level of the second control signal GAS2 pulls the level of the scanning signal G(n) of the nth-level GOA unit up via the second thin-film transistor T2. The risk of abnormal display resulted from the residual of charges in pixels due to the abnormal power-off of the GOA circuit is reduced.

Figure 3:
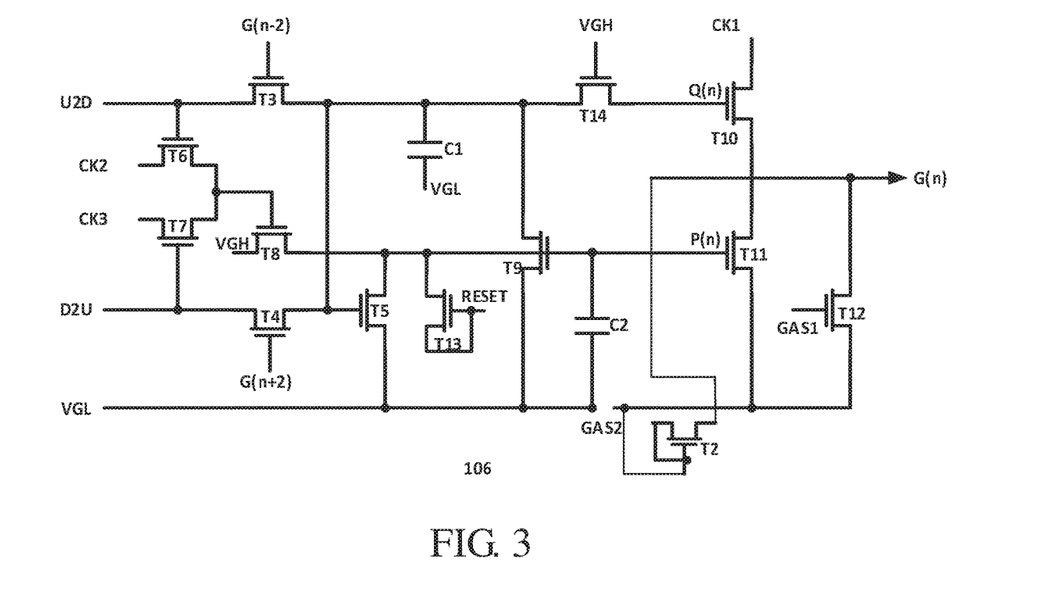
FIG. 3 is another circuit diagram of the GOA circuit according to a preferred embodiment of the present invention.

Please refer to FIG. 3, which is another circuit diagram of the GOA circuit according to the embodiment of the present invention. Referring to FIG. 3, the difference between this GOA circuit and the GOA circuit shown in FIG. 1 is that this GOA circuit further comprises a fourteenth thin-film transistor T14.

A source of the fourteenth thin-film transistor T14 is connected to a drain of the third thin-film transistor T3, the constant-voltage high level VGH is applied to a gate of the fourteenth thin-film transistor T14, and a drain of the fourteenth thin-film transistor T14 is connected to the first node Q(n).

It is to be noted that, when the GOA circuit of the present invention operates, the constant-voltage high level is applied to the gate of the fourteenth thin-film transistor so that the fourteenth thin-film transistor is in the ON state.

In addition, in the GOA circuit of the present invention, according to specific requirements, it is also possible to adjust the level of signals applied to the gate of the fourteenth thin-film transistor to control the state of the fourteenth thin-film transistor. Thus, the application of this GOA circuit is more flexible.

In the GOA circuit provided in the embodiments of the present disclosure, by providing an abnormity protection module in the nth-level GOA unit, the level of the scanning signal of the nth-level GOA unit is pulled up when the embedded touch display panel is powered off abnormally. The risk of abnormal display resulted from the residual of charges in pixels due to the abnormal power-off of the GOA circuit is reduced.

The present disclosure further provides an embedded touch display panel that includes the foregoing GOA circuit, and therefore it can be specifically referred to the foregoing preferred embodiment and will not described in detail again to avoid redundancy.

In a GOA circuit and an embedded touch display panel according to the embodiment of the present disclosure, by providing an abnormity protection module in the nth-level GOA unit, the level of the scanning signal of the nth-level GOA unit is pulled up when the embedded touch display panel is powered off abnormally. The risk of abnormal display resulted from the residual of charges in pixels due to the abnormal power-off of the GOA circuit is reduced.

The liquid crystal display assembly according to the embodiments of the present disclosure has been described in detail above. The principles and implementations of the present disclosure have been explained by specific cases. The description of the embodiments is merely used for helping understand the present disclosure. Meanwhile, it will be understood by those skilled in the art that various modifications may be made to the specific implementations and application ranges without departing from the spirit of the present disclosure. The content of the description will not be interpreted as any limitations to the present disclosure.

What is claimed is:

1. A GOA (Gate driver On Array) circuit applied in an embedded touch display panel, comprising multiple levels of GOA units which are cascaded with each other, the nth-level GOA unit comprising a forward/reverse scanning control module, a node control module, an output module, an output control module, and an abnormity protection module; wherein the forward/reverse scanning control module is configured to output a first node control signal at a first node and output a second node control signal at a second node according to a forward scanning DC control signal and a reverse scanning DC control signal;

the node control module is coupled to the first node and the second node and configured to pull the first node control signal down to a constant-voltage low level and pull the second node control signal up to a constant-voltage high level;

the output module is coupled to the first node and electrically connected to a first clock signal and configured to output a scanning signal according to the first node control signal and the first clock signal;

the output control module is electrically connected to the first control signal and configured to control the level of the scanning signal according to the first control signal; and the abnormity protection module is coupled to an output end of the output module and electrically connected to a second control signal, and configured to pull the level of the scanning signal up when the embedded touch display panel is powered off abnormally;

wherein the abnormity protection module comprises a second thin-film transistor; and the second control signal is applied to a source and a gate of the second thin-film transistor, and a drain of the second thin-film transistor is connected to the output end of the output module;

when the GOA circuit scans forward, the forward scanning DC control signal is in high level and the reverse scanning DC control signal is in low level; and when the GOA circuit scans reversely, the forward scanning DC control signal is in low level and the reverse scanning DC control signal is in high level.

2. The GOA circuit as claimed in claim 1, wherein the forward/reverse scanning control module comprises a third thin-film transistor, a fourth thin-film transistor, a fifth thin-film transistor, a first capacitor and a second capacitor;

the forward scanning DC control signal is applied to a source of the third thin-film transistor, a scanning signal of a (n−2)th-level GOA unit is applied to a gate of the third thin-film transistor, and a drain of the third thin-film transistor is connected to the first node, a drain of the fourth thin-film transistor, and a gate of the fifth thin-film transistor;

the reverse scanning DC control signal is applied to a source of the fourth thin-film transistor, and a scanning signal of a (n+2)th-level GOA unit is applied to a gate of the fourth thin-film transistor;

the constant-voltage low level is applied to a source of the fifth thin-film transistor, and a drain of the fifth thin-film transistor is connected to the second node;

one end of the first capacitor is connected to the first node and the constant-voltage low level is applied to the other end of the first capacitor; and one end of the second capacitor is connected to the second node and the constant-voltage low level is applied to the other end of the second capacitor.

3. The GOA circuit as claimed in claim 1, wherein the node control module comprises a sixth thin-film transistor, a seventh thin-film transistor, an eighth thin-film transistor and a ninth thin-film transistor;

a second clock signal is applied to a source of the sixth thin-film transistor, the forward scanning DC control signal is applied to a gate of the sixth thin-film transistor, and a drain of the sixth thin-film transistor is connected to a gate of the eighth thin-film transistor;

a third clock signal is applied to a source of the seventh thin-film transistor, the reverse scanning DC control signal is applied to a gate of the seventh thin-film transistor, and a drain of the seventh thin-film transistor is connected to the gate of the eighth thin-film transistor;

the constant-voltage high level is applied to a source of the eighth thin-film transistor, and a drain of the eighth thin-film transistor is connected to the second node; and the constant-voltage low level is applied to a source of the ninth thin-film transistor, a gate of the ninth thin-film transistor is connected to the second node, and a drain of the ninth thin-film transistor is connected to the first node.

4. The GOA circuit as claimed in claim 1, wherein the output module comprises a tenth thin-film transistor; and the first clock signal is applied to a source of the tenth thin-film transistor, a gate of the tenth thin-film transistor is connected to the first node, and a drain of the tenth thin-film transistor is connected to the output end of the output module.

5. The GOA circuit as claimed in claim 1, wherein the output control module comprises an eleventh thin-film transistor and a twelfth thin-film transistor;

the second control signal is applied to a source of the eleventh thin-film transistor, a gate of the eleventh thin-film transistor is connected to the second node, and a drain of the eleventh thin-film transistor is connected to the output end of the output module; and the second control signal is applied to a source of the twelfth thin-film transistor, the first control signal is applied to a gate of the twelfth thin-film transistor, and a drain of the twelfth thin-film transistor is connected to the output end of the output module.

6. The GOA circuit as claimed in claim 1, wherein the nth-level GOA unit further comprises a reset module; and the reset module comprises a thirteenth thin-film transistor, a reset signal is applied to a source and to a drain of the thirteenth thin-film transistor, and a drain of the thirteenth thin-film transistor is electrically connected to the second node.

7. A GOA (Gate driver On Array) circuit applied in an embedded touch display panel, comprising multiple levels of GOA units which are cascaded with each other, the nth-level GOA unit comprising a forward/reverse scanning control module, a node control module, an output module, an output control module, and an abnormity protection module; wherein the forward/reverse scanning control module is configured to output a first node control signal at a first node and output a second node control signal at a second node according to a forward scanning DC control signal and a reverse scanning DC control signal;

the node control module is coupled to the first node and the second node and configured to pull the first node control signal down to a constant-voltage low level and pull the second node control signal up to a constant-voltage high level;

the output module is coupled to the first node and electrically connected to a first clock signal and configured to output a scanning signal according to the first node control signal and the first clock signal;

the output control module is electrically connected to the first control signal and configured to control the level of the scanning signal according to the first control signal; and the abnormity protection module is coupled to an output end of the output module and electrically connected to a second control signal, and configured to pull the level of the scanning signal up when the embedded touch display panel is powered off abnormally.

8. The GOA circuit as claimed in claim 7, wherein the abnormity protection module comprises a second thin-film transistor; and the second control signal is applied to a source and a gate of the second thin-film transistor, and a drain of the second thin-film transistor is connected to the output end of the output module.

9. The GOA circuit as claimed in claim 7, wherein the forward/reverse scanning control module comprises a third thin-film transistor, a fourth thin-film transistor, a fifth thin-film transistor, a first capacitor and a second capacitor;

the forward scanning DC control signal is applied to a source of the third thin-film transistor, a scanning signal of a (n−2)th-level GOA unit is applied to a gate of the third thin-film transistor, and a drain of the third thin-film transistor is connected to the first node, a drain of the fourth thin-film transistor, and a gate of the fifth thin-film transistor;

the reverse scanning DC control signal is applied to a source of the fourth thin-film transistor, and a scanning signal of a (n+2)th-level GOA unit is applied to a gate of the fourth thin-film transistor;

the constant-voltage low level is applied to a source of the fifth thin-film transistor, and a drain of the fifth thin-film transistor is connected to the second node;

one end of the first capacitor is connected to the first node and the constant-voltage low level is applied to the other end of the first capacitor; and one end of the second capacitor is connected to the second node and the constant-voltage low level is applied to the other end of the second capacitor.

10. The GOA circuit as claimed in claim 7, wherein the node control module comprises a sixth thin-film transistor, a seventh thin-film transistor, an eighth thin-film transistor and a ninth thin-film transistor;

a second clock signal is applied to a source of the sixth thin-film transistor, the forward scanning DC control signal is applied to a gate of the sixth thin-film transistor, and a drain of the sixth thin-film transistor is connected to a gate of the eighth thin-film transistor;

a third clock signal is applied to a source of the seventh thin-film transistor, the reverse scanning DC control signal is applied to a gate of the seventh thin-film transistor, and a drain of the seventh thin-film transistor is connected to the gate of the eighth thin-film transistor;

the constant-voltage high level is applied to a source of the eighth thin-film transistor, and a drain of the eighth thin-film transistor is connected to the second node; and the constant-voltage low level is applied to a source of the ninth thin-film transistor, a gate of the ninth thin-film transistor is connected to the second node, and a drain of the ninth thin-film transistor is connected to the first node.

11. The GOA circuit as claimed in claim 7, wherein the output module comprises a tenth thin-film transistor; and the first clock signal is applied to a source of the tenth thin-film transistor, a gate of the tenth thin-film transistor is connected to the first node, and a drain of the tenth thin-film transistor is connected to the output end of the output module.

12. The GOA circuit as claimed in claim 7, wherein the output control module comprises an eleventh thin-film transistor and a twelfth thin-film transistor;

the second control signal is applied to a source of the eleventh thin-film transistor, a gate of the eleventh thin-film transistor is connected to the second node, and a drain of the eleventh thin-film transistor is connected to the output end of the output module; and the second control signal is applied to a source of the twelfth thin-film transistor, the first control signal is applied to a gate of the twelfth thin-film transistor, and a drain of the twelfth thin-film transistor is connected to the output end of the output module.

13. The GOA circuit as claimed in claim 7, wherein the nth-level GOA unit further comprises a reset module; and the reset module comprises a thirteenth thin-film transistor, a reset signal is applied to a source and to a drain of the thirteenth thin-film transistor, and a drain of the thirteenth thin-film transistor is electrically connected to the second node.

14. The GOA circuit as claimed in claim 7, wherein, when the GOA circuit scans forward, the forward scanning DC control signal is in high level and the reverse scanning DC control signal is in low level; and when the GOA circuit scans reversely, the forward scanning DC control signal is in low level and the reverse scanning DC control signal is in high level.

15. An embedded touch display panel, comprising a GOA circuit, wherein the GOA circuit is configured to be applied in an embedded touch display panel and comprises multiple levels of GOA units which are cascaded with each other, the nth-level GOA unit comprising a forward/reverse scanning control module, a node control module, an output module, an output control module, and an abnormity protection module; wherein the forward/reverse scanning control module is configured to output a first node control signal at a first node and output a second node control signal at a second node according to a forward scanning DC control signal and a reverse scanning DC control signal;

the node control module is coupled to the first node and the second node and configured to pull the first node control signal down to a constant-voltage low level and pull the second node control signal up to a constant-voltage high level;

the output module is coupled to the first node and electrically connected to a first clock signal and configured to output a scanning signal according to the first node control signal and the first clock signal;

the output control module is electrically connected to the first control signal and configured to control the level of the scanning signal according to the first control signal; and the abnormity protection module is coupled to an output end of the output module and electrically connected to a second control signal, and configured to pull the level of the scanning signal up when the embedded touch display panel is powered off abnormally.

16. The embedded touch display panel as claimed in claim 15, wherein the abnormity protection module comprises a second thin-film transistor; and the second control signal is applied to a source and a gate of the second thin-film transistor, and a drain of the second thin-film transistor is connected to the output end of the output module.

17. The embedded touch display panel as claimed in claim 15, wherein, when the GOA circuit scans forward, the forward scanning DC control signal is in high level and the reverse scanning DC control signal is in low level; and when the GOA circuit scans reversely, the forward scanning DC control signal is in low level and the reverse scanning DC control signal is in high level.

18. The embedded touch display panel as claimed in claim 15, wherein the forward/reverse scanning control module comprises a third thin-film transistor, a fourth thin-film transistor, a fifth thin-film transistor, a first capacitor and a second capacitor;

the forward scanning DC control signal is applied to a source of the third thin-film transistor, a scanning signal of a (n−2)th-level GOA unit is applied to a gate of the third thin-film transistor, and a drain of the third thin-film transistor is connected to the first node, a drain of the fourth thin-film transistor, and a gate of the fifth thin-film transistor;

the reverse scanning DC control signal is applied to a source of the fourth thin-film transistor, and a scanning signal of a (n+2)th-level GOA unit is applied to a gate of the fourth thin-film transistor;

the constant-voltage low level is applied to a source of the fifth thin-film transistor, and a drain of the fifth thin-film transistor is connected to the second node;

one end of the first capacitor is connected to the first node and the constant-voltage low level is applied to the other end of the first capacitor; and one end of the second capacitor is connected to the second node and the constant-voltage low level is applied to the other end of the second capacitor.

19. The embedded touch display panel as claimed in claim 15, wherein the node control module comprises a sixth thin-film transistor, a seventh thin-film transistor, an eighth thin-film transistor and a ninth thin-film transistor;

a second clock signal is applied to a source of the sixth thin-film transistor, the forward scanning DC control signal is applied to a gate of the sixth thin-film transistor, and a drain of the sixth thin-film transistor is connected to a gate of the eighth thin-film transistor;

a third clock signal is applied to a source of the seventh thin-film transistor, the reverse scanning DC control signal is applied to a gate of the seventh thin-film transistor, and a drain of the seventh thin-film transistor is connected to the gate of the eighth thin-film transistor;

the constant-voltage high level is applied to a source of the eighth thin-film transistor, and a drain of the eighth thin-film transistor is connected to the second node; and the constant-voltage low level is applied to a source of the ninth thin-film transistor, a gate of the ninth thin-film transistor is connected to the second node, and a drain of the ninth thin-film transistor is connected to the first node.

20. The embedded touch display panel as claimed in claim 15, wherein the output module comprises a tenth thin-film transistor; and the first clock signal is applied to a source of the tenth thin-film transistor, a gate of the tenth thin-film transistor is connected to the first node, and a drain of the tenth thin-film transistor is connected to the output end of the output module.

* * * * *